United States Patent [19]

Fogel

[11] Patent Number: 5,619,566

[45] Date of Patent: Apr. 8, 1997

[54] VOICE ACTIVITY DETECTOR FOR AN ECHO SUPPRESSOR AND AN ECHO SUPPRESSOR

[75] Inventor: Eliezer Fogel, Tel Aviv, Israel

[73] Assignee: Motorola, Inc., Schaumburg, Ill.

[21] Appl. No.: 338,581

[22] PCT Filed: Aug. 11, 1994

[86] PCT No.: PCT/IB94/00285

§ 371 Date: Jul. 20, 1995

§ 102(e) Date: Jul. 20, 1995

[87] PCT Pub. No.: WO95/06382

PCT Pub. Date: Mar. 2, 1995

[30] Foreign Application Priority Data

Aug. 27, 1993 [GB] United Kingdom ............... 9317825

[51] Int. Cl.⁶ ............... H04M 9/08; G10L 5/00
[52] U.S. Cl. ............ 379/406; 379/389; 379/390; 379/409; 395/2.16
[58] Field of Search ............... 379/409, 406, 379/410, 411, 388, 389, 390, 392; 370/32.1; 395/2.16, 2.35, 2.36; 381/38, 46, 47, 49

[56] References Cited

U.S. PATENT DOCUMENTS

| 3,784,747 | 1/1974 | Berkley et al. ............ 379/388 |
|---|---|---|
| 4,644,108 | 2/1987 | Crouse et al. ............ 379/406 |
| 4,864,608 | 9/1989 | Miyamoto et al. ............ 379/409 |
| 5,276,765 | 1/1994 | Freeman et al. ............ 395/2 |
| 5,343,521 | 8/1994 | Jullien et al. ............ 379/406 X |
| 5,365,583 | 11/1994 | Huang et al. ............ 379/390 |
| 5,475,731 | 12/1995 | Rasmusson ............ 379/406 X |

FOREIGN PATENT DOCUMENTS

| 0330384 | 8/1989 | European Pat. Off. . |
|---|---|---|
| 91/03116 | 3/1991 | WIPO . |
| 92/12583 | 7/1992 | WIPO . |
| 93/06679 | 4/1993 | WIPO . |

OTHER PUBLICATIONS

Freeman et al., "The Voice Activity Detector for the Pan–European Digital Cellular Mobile Telephone Service", ICASSP 89, Glasgow, Scotland, 23 May 1989, vol. 1, pp. 369–372.

Jullien et al., "Acoustic Echo Controller for Wide–Band Hands–Free Telephony", Proc. of EUSIPCO–90, Sep. 18, 1990, Barcelona, Spain, pp. 1983–1986.

Wehrmann, "Concepts of Improving Hands–Free Speech Communication", IEEE International Symposium on Circuits and Systems, May 10, 1992, San Diego, CA, vol. 4, pp. 1918–1921.

Yasukawa et al., "An Acoustic Echo Canceller Using Sub-band Sampling and Decorrelation Methods", IEEE Transactions on Signal Processing, Feb. 1993, vol. 41, No. 2, pp. 926–930.

*Primary Examiner*—Krista M. Zele
*Assistant Examiner*—Devendrä T. Kumar
*Attorney, Agent, or Firm*—Andrew S. Fuller

[57] ABSTRACT

A voice activity detector is described suitable for use in an echo suppressor. It comprises a whitening filter (19) for levelling the spectrum of the audio signal on the transmit path to provide a levelled signal and decision means (20) coupled to the whitening filter to measure energy in the levelled signal and thereby to detect voice on the transmit path. The whitening filter is a voice whitening filter which is adapted (8, 19) according to the voice parameters received by the voice decoder in the receive path. In a second aspect, a near-end voice entered into the transmit path is distinguished from a far-end voice resulting from an echo from the receive path and transmit and receive attenuators (26, 27) are arranged in a first disposition when voice on the transmit path is substantially due to echo from the receive path and in a second disposition when voice on the transmit path is at least partially due to near-end voice.

15 Claims, 2 Drawing Sheets

| NEAR-END | FAR-END | Tx | Rx |
|---|---|---|---|
| 0 | 0 | 0 | 0 |
| 0 | 1 | Z | 0 |
| 1 | 0 | 0 | 0 |
| 1 | 1 | X | Y |

VOICE ACTIVITY DETECTOR FOR AN ECHO SUPPRESSOR AND AN ECHO SUPPRESSOR

FIELD OF THE INVENTION

This invention relates to a voice activity detector suitable for use in an echo suppressor and, separately and in addition, it relates to an echo suppressor. The invention addresses the problem of the detection of voice (speech) in the presence of another speaker.

The need for voice activity detection arises, for example, in a (Vehicular) Speaker Phone (VSP) where the outbound (land to mobile) speech is introduced in the vehicle loudspeaker and the vehicle phone user may want to break in. Herein the abbreviation VAD is used for voice activity detection and voice activity detector, as the context requires.

BACKGROUND OF THE INVENTION

An arrangement which allows double talk in a full duplex communication channel is echo cancellation, where the outbound speech is cancelled at the inbound path. However, this arrangement is very expensive in terms of computation resources and thus is often not feasible.

At the other extreme, handling echoes in the vehicular environment is possible using the concept of an echo suppressor based on standard voice detection given a noisy background.

CCITT recommendation G.164 of 1988 Fascicle III.1 pages 186–205 describes generalised echo suppressors, among which a Type D echo suppressor is entirely digital and provides voice coding of a near-end voice and decoding (or synthesis) of a far-end voice. In such arrangements, "background speech" parameters are available if, for example, LPC type coding is performed as in many modern communication systems.

However, a conventional echo suppressor will not operate well in a full duplex situation where the loudspeaker power is comparable to the local user voice power, since its voice detection is based on the distinction between the speech power and/or its characteristics from those of the stationary background noise. Thus, either the loudspeaker voice will be detected by the VAD or the local user will be blocked when the far out VAD indicates activity.

Standard, present day VADs in the VSP context, are based on measuring the signal energy relative to background noise energy (Noise Riding Threshold (NRT)type detection). To implement such a detector, the VAD has to be able first to detect noise, estimate its instantaneous energy level, and subsequently detect speech if the signal energy exceeds a threshold (above the noise floor). In more advanced VADs the noise spectral characteristics are also estimated, and the energy out of the whitening inverse filter is used for the VAD. The process of distinguishing noise from voice is sometimes augmented with additional features extraction e.g. stationarity test and/or periodicity check (the noise being stationary and nonperiodic compared to speech).

GSM recommendation 06.32, 22 May 1989 is an example of energy based VAD where the energy is measured at the output of the inverse of the background noise shaping filter ("whitening" filter). The details, including the procedure for adapting the threshold and calculation of the filtered energy are given in that document.

SUMMARY OF THE INVENTION

According to a first aspect of the invention, a voice activity detector for an echo suppressor is provided, comprising: a receive audio path having a voice decoder for receiving voice parameters and synthesizing voice therefrom, a transmit audio path, a whitenrag filter for levelling the spectrum of the audio signal on the transmit path to provide a levelled signal, and decision means coupled to the whitening filter to measure energy in the levelled signal and thereby to detect voice on the transmit path, characterized in that the whitening filter is a voice whitening filter and means are provided for adapting the whitening filter according to the voice parameters received by the voice decoder in the receive path.

Thus the invention, in at least its first aspect, solves the problem of the detection of voice (speech) in the presence of another user by basing the detection on the other user speech characteristics.

In a second aspect of the invention, an echo suppressor is provided comprising a receive audio path having a voice decoder for receiving voice parameters and synthesizing voice therefrom, a transmit audio path, receive and transmit attenuation means in the respective paths for attenuation of audio signals on those paths, a voice activity detector for detecting voice on the transmit path and coupled to the receive and transmit attenuator means for controlling the attenuator means to suppress audio signals on the respective paths when voice is detected on the transmit path, means in the transmit path for distinguishing between a near-end voice entered into the transmit path and a far-end voice entered into the transmit path as a result of an echo from the receive path and means for providing a first disposition of the transmit and receive attenuators when voice on the transmit path is substantially due to echo from the receive path and a second disposition of the transmit and receive attenuators when voice on the transmit path is at least partially due to near-end voice.

The means in the transmit path for distinguishing between a near-end voice entered into the transmit path and a far-end voice entered into the transmit path may include a voice whitening filter and means for adapting the voice whitening filter according to the voice parameters received by the voice decoder in the receive path and/or those means may include pitch distinguishing means.

Echo suppressors in full duplex operation should allow the VSP user to break in at his will, that is to say the logic should allow for double talk. As a result the far-end user may hear the VSP user superimposed on his own echo. Although this is not a desirable situation, the present invention, at least in its preferred embodiment, makes the assumption that in a double talk situation the far-end user can cope with his echo if it is attenuated relative to the VSP user speech level (see below).

To achieve the above objectives the echo suppressor of the present invention, at least in its preferred embodiment, includes two features beyond state of the art VADs as follows: (1) the ability to detect the local speech in the presence of speech from the loudspeaker, i.e. to distinguish between the two speakers; (2) adjustable inbound and outbound attenuators rather than infinite attenuation (blocking) of the outbound path.

DETAILED DESCRIPTION OF THE PREFERRED EMBODIMENTS

Figure 1:
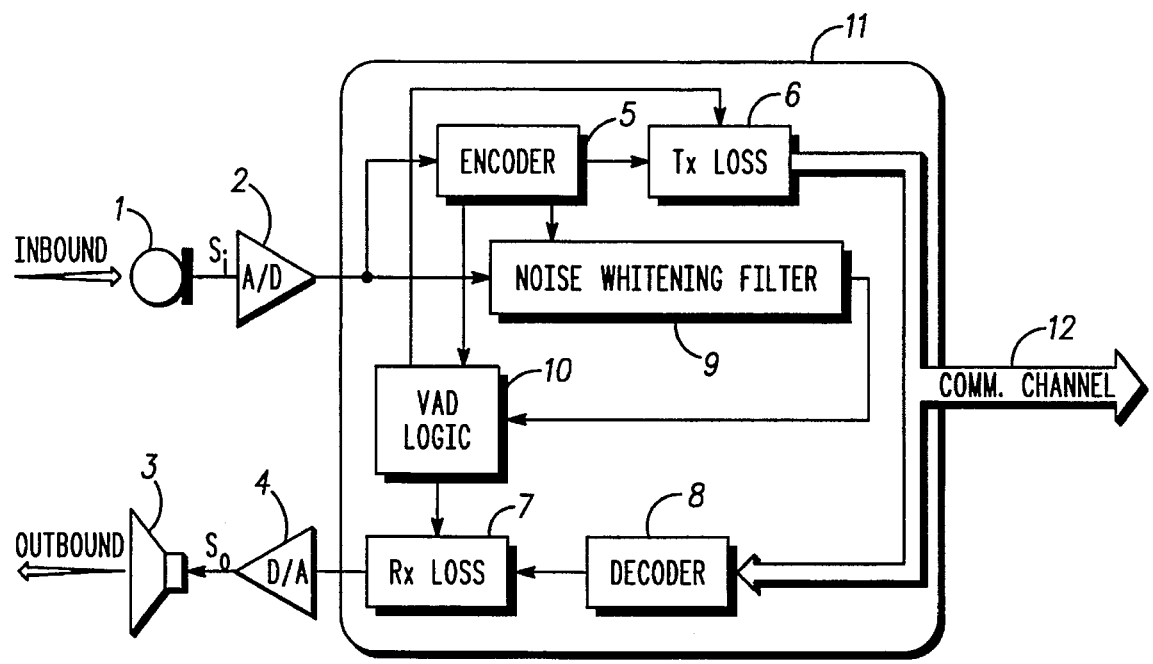
FIG. 1 shows a block diagram of a prior art echo suppressor.

FIG. 1 shows a block diagram of a prior art voice activity detector and echo suppressor. It consists of an inbound voice activity detector which in its advance form (GSM 06.32) includes: a microphone 1, an A/D converter 2, a loudspeaker 3, a D/A converter 4, and a digital signal processor DSP 11. Within the DSP various blocks or programs are embodied as follows. An adaptive whitening filter 9 is provided which is adapted to cancel the background noise spectrum. The adaptation may be based on the LPC parameters estimated within the encoder 5. VAD logic 10 is provided which compares the energy of the signal levelled by the filter 9 with respect to the background noise against a threshold. Once voice activity is detected by the VAD logic 10, a transmit attenuator 6 and/or receive attenuator 7 is inserted in the corresponding path to suppress the echo. Attenuator 6 has, typically, an attenuation value larger than 46 dB and is switched in or out of the circuit, giving virtual total blocking. Attenuator 7 is described in theory in CCITT recommendation G.164 but is not used in practice. The DSP is interfaced to the communication channel 12. Note that the DSP and its embodied blocks may be implemented in a single microprocessor or as a combination of processors and circuits as is convenient.

The VAD of FIG. 1 enables the detection of speech relative to the background noise but will fail to detect local user voice while far-end speech is introduced at the loudspeaker 3.

Figure 2:
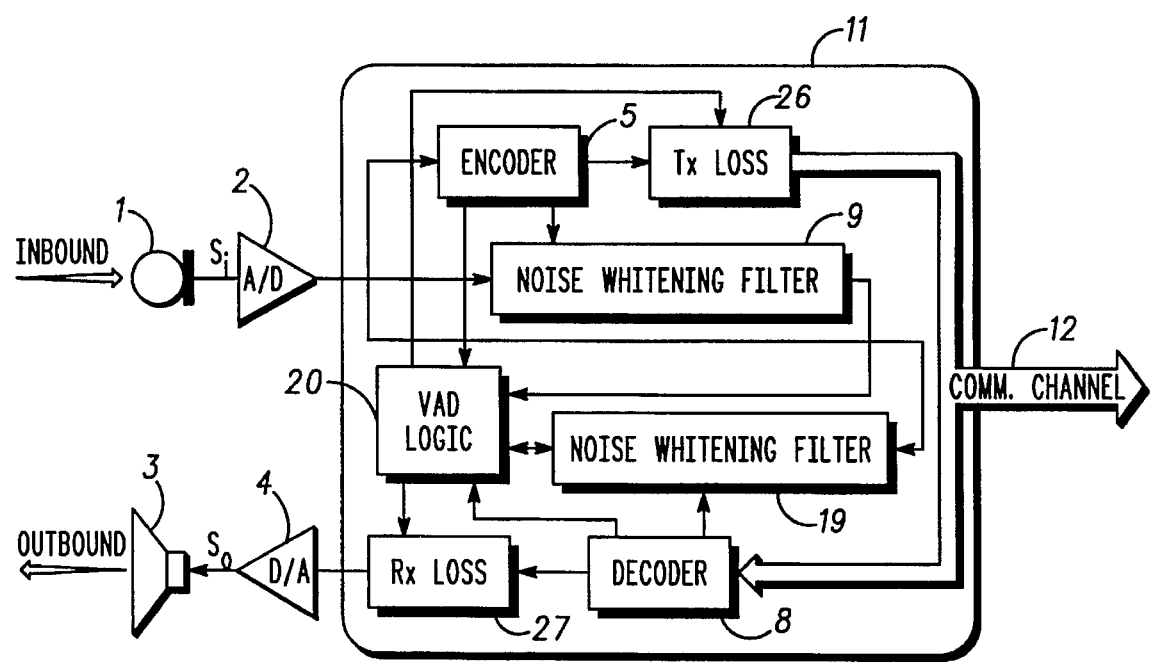
FIG. 2 shows a block diagram of an echo suppressor according to the preferred embodiment of this invention.

The additional two features mentioned above are reflected in FIG. 2, which shows a block diagram of an echo suppressor according to the preferred embodiment of this invention. A principal addition to the arrangement of FIG. 1 is a voice whitening filter 13 which uses the LPC parameters of the outbound speech. These parameters are available from the speech decoder 8. In the arrangement of FIG. 2, attenuators 26 and 27 are provided. These are variable attenuators. VAD decision logic 20 is shown, the details of which are given below.

The VAD is operating in dual mode namely, either the conventional technique as in the prior art is used when the far-end user is silent, or the algorithm detailed below is invoked when the outbound speaker is active. The outbound voice activity status is known from the decoder 8.

Figures 3, 4:
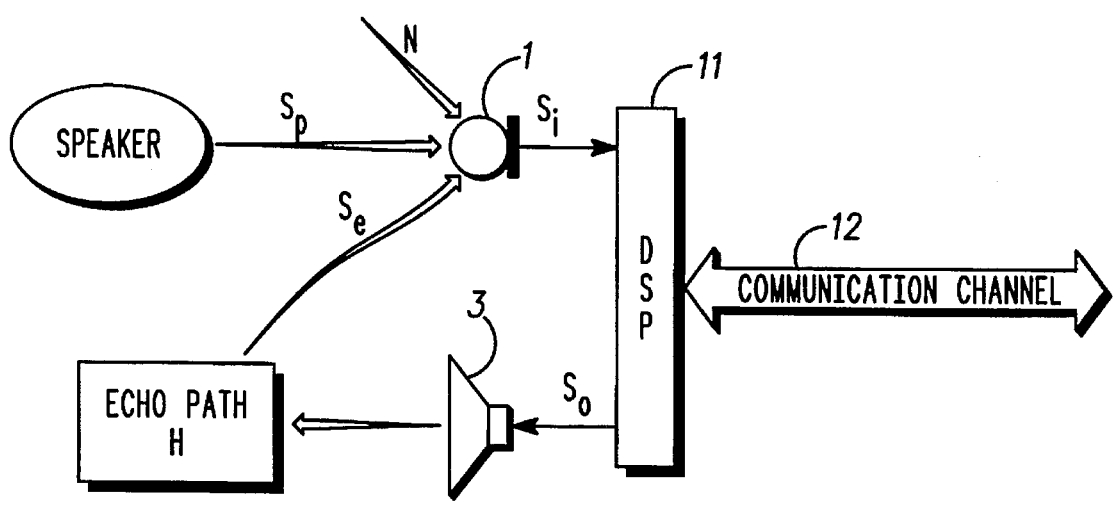
FIG. 3 is a truth table for explaining the operation of the arrangement of FIG. 2.
FIG. 4 shows a model of the relevant audio signal path for the echo suppressor of relevance to the prior art and the invention.

The losses introduced in the inbound path (Tx Loss) and the outbound path (Rx Loss) follow the truth table set out in FIG. 3.

In FIG. 3, the first and second columns show the user states (1=speaking, 0=not speaking) for the near-end (VSP) user and the far-end user respectively. The challenge is to distinguish between and to control the cases represented by the second and forth rows in the table, that is to say the case where only the far-end user is talking (the second row, in which case echo of that speech appears as voice in the transmit path) and the case where both users are talking (the fourth row of the table).

The third and fourth columns show the amount of attenuation to be introduced in the transmit and receive attenuators 26 and 27 respectively.

The value Z in the echo only situation (far end user talking, VSP user silent) should include the loudspeaker to microphone loss/gain. A value Z=46 dB corresponding to the GSM Recommendation 3.5 is an acceptable one. No attenuation should be introduced if no echo is expected i.e. when the far end user is silent (Far end user=0), except if such a loss is required to avoid instability. The values of X and Y in the double-talk state should satisfy the relation XdB+ YdB<ZdB.

The logic as depicted in FIG. 3 is based on the availability of a VSP VAD and a far-end user VAD. The former is present in encoder 5 and the latter is present in the form of a voice indicator received in decoder 8 from the far-end encoder (also used for discontinuous transmission purposes). The timing of attenuation insertion and removal based on the VAD should be designed to minimize clipping while avoiding false transitions due to impulsive noise. A possible approach is to adopt CCITT Recommendation P0.34 "Transition Characteristics of Hands Free Telephone" or similar logic.

A key issue in the application of the VSP depicted in FIG. 2 is the VAD design for the case of far-end user active. This is now discussed in detail.

The solution of Tx VAD for the VSP of FIG. 2 incorporates information from the inbound and outbound signals. Since most digital speech encoded communication protocols include a VAD indication (see GSM standard), the presence or absence of outbound speech is known at the VSP apparatus. Furthermore, if the far-end user is not talking, i.e. his VAD indicates "0", the local speech encoder VAD should give the appropriate indication of the VSP user voice activity using prior art techniques. Thus, using the far-end user VAD indication, the states represented by the first and third rows of the table of FIG. 3 are known within the state of the art.

However if the far-end user VAD indication is "1", the local VAD should be activated in "double talk" mode, for the detection of the start of the VSP user talk-spurt and the detection of the end of the talk-spurt. The following discussion deals only with VAD operation when the far-end user VAD=1.

To enable local voice activity detection when the far-end user VAD indication is "1", it is recommended to use the outbound and inbound vocoder parameters which may contribute to the identification of multiple speakers (local and far-end user) vs. single speaker (far-end user only) states. The vocoder of consideration is of the LPC type such as CELP, VSELP, RLPT etc. Such vocoders extract the speech parameters in time periods referred to as frames (of the order of 30 ms). Often some parameters, e.g. pitch, are updated more often in a sub frame rate (e.g. every 7.5 ms.) This structure and information are used in the VAD of the present invention.

To establish the notation and the relevant basis for the VAD description, a model of the relevant audio signal path is presented. FIG. 4 represents the relevant signals where a digital signal processor (DSP) 11 represents the device/ algorithms and associated circuitry to realize an echo suppressor and its associated VAD.

The signals available for the DSP to perform the VAD are:

So—the decoded (synthesized) voice and its associated encoder parameters; and

Si—the microphone input, which is a superposition of:

Sp—the local speaker generated signal (speech: voice, unvoiced or silence);

Se—the acoustic echo of So and

N—the vehicle background noise.

The echoed signal Se is a filtered and delayed version of So and can be represented by $$Se(t)=h(t)*So(t-d) \quad (1)$$

where h(t) is the delay free impulse response of the echo path;

d is the (pure) delay of the echo path; and

* is the convolution operator.

It is assumed here that the echo path is linear as reflected in equation 1. The term h(t) represents a direct path from loudspeaker to microphone+reverberation effect.

The delay can be estimated, assuming that the loudspeaker to microphone distance is in the range of 0.33 m to 1.5 m, to be 1 ms<d<5 ms For 8 KHz sampling rate this corresponds to 8 to 40 samples delay. This is of the order of at most one sub frame of a typical LPC vocoder.

To facilitate the detection of a local speech spurt based on energy consideration whilst the far-end user is talking, it is proposed to evaluate the energy of the "whitened" Si signal where the whitening filter is based on the far-end speech synthesis filter available from the coder. This energy level should be compared to a threshold established as described below.

The efficient implementation of the energy calculation and threshold evaluation is similar to that presented in GSM recommendation 06.32 with some modifications as follows.

$P_{vad}$ $P_{vad}$ can be evaluated efficiently as described in GSM recommendation 06.32. The difference from $P_{vad}$ calculations in GSM 06.32 is the use of the Rx filter coefficients rather than the noise estimated spectral characteristics. This operation has the effect of minimizing a distortion measure of the echoed signal while emphasizing different signals (i.e. the local user).

THVAD

THVAD in the noise only case is determined, to be Q*[the noise inverse-filtered energy](Q=3 is recommended). Semi stationarity of the noise is being taken advantage of for bootstrapping (threshold arid filter parameters adaptation).

In the break-in case, THVAD should be varied to enable tracking the fast changing, albeit available, far-end speech energy variation. Thus for the k-th sub frame, the following steps are proposed:

Estimate Energy $$E_{est}(k)=A_1.E_o(k)+A_2.E_o(k-1) \quad (2.1)$$

Evaluate Threshold $$THVAD(k)=Q.[B.E_{est}(k)+(1-B).THVAD(K-1)] \quad (2.2)$$

where $E_{est}(k)$=estimated (microphone) energy in subframe k;

$A_i$=filter coefficients (see "bootstrapping" below);

$E_{est}(k)$ = estimated (microphone) energy in subframe k;

$A_i$ = filter coefficients (see "bootstrapping" below);

$E_o(k)$ = energy out (i.e. at the loudspeaker) in subframe k;

= frame energy*subframe_gain (coder parameters);

$Q$ = threshold factor (e.g. 3); and $B$ = THVAD adaption time constant.

Q=threshold factor (e.g. 3); and

B=THVAD adaptation time constant.

Bootstrapping

For VAD operating in noise background the distinction between noise and speech is based on stationarity and periodicity tests. The first parameter is not valid in the present context where speech has to be detected on another voice background. Periodicity (pitch) is discussed further below.

Thus the following criterion to enable the detection of the far-end only state should be utilized:

Estimate error and compare to threshold $$\|Error(k)\|=\|E_i(k)-E_{est}(k)\|<Th \quad (3)$$

where $E_i(k)$=energy in (i.e. at microphone) in subframe k

Th=threshold

Accordingly, the parameters $A_i$ of the energy estimator in equation 2.1 should be adjusted (in [near-end, far-end]=[0,1] state while in voice mode) to minimize the error as defined in equation 3. Any adaptive search algorithm (e.g. LMS, WRLS) can be implemented for that purpose. The simplest such a procedure is normalised LMS.

Adaptive Filter Adaptation $$\underline{A}(k+1)=\underline{A}(k)+mE_o/(E_o^T E_o).Error(k) \quad (4)$$

$\underline{A}=[A_1 A_2]^T$ $\underline{E}_o=[E_o(k)E_o(k-1)]^T$ $Error(k)=E_i(k)-\underline{A}(k)^T\underline{E}_o$ m =adaptation constant (may be time dependent)

where superscript T denotes vector transposition, and vectors are denoted by underlined values.

The parameters $\underline{A}$ reflect the echo path and should be adjusted during far-end speech only in voiced mode. It can be reasonably assumed that these parameters would change very slowly and that most of the time the double-talk state will not exist. Thus, after a short time of adaptation, $\underline{A}$ should not vary significantly and the error should stay small except if the local user breaks in. $\underline{A}$ can have nominal values which reflect the vehicle cabin acoustics. At the end of a conversation the new estimated parameters may be updated in non-volatile memory.

VAD

The derision of a break-in (and break-out) can thus be based on $E_i(k)$ exceeding THVAD(k) and/or the Error(k) exceeding a threshold. Hangover time for break-in and break-out should be similar in concept to standard approaches (avoid break-in of impulsive noise on one hand, and avoid clipping of speech on the other hand).

Pitch

A further parameter for the separation of speakers is pitch (and its harmonics). Present day algorithms for speaker separation, are relatively complex and are not relevant to the echo suppressor problem at hand. However, since the pitch does not vary in the echo path, it may be used advantageously for the double-talk state detection. The following is proposed as a technique augmenting tile energy procedure described above.

Some vocoders reflect pitch information m the lag, e.g. VSELP, (and since the lag may correspond to harmonic or sub harmonic of pitch$^{-1}$,) the fundamental pitch track of So (fundamental lag track) has first to be established from the received signal. A similar smoothing procedure of that in equation 2.1 above should be employed to compensate for the echo path delay.

Subsequently, a break-in state should be declared if the Si pitch detector (lag estimator) produces different pitch (lag) from the expected pitch/pitch-harmonies (lag) m the echo signal.

I claim:

1. A voice activity detector for an echo suppressor, comprising:

a receive audio path having a voice decoder for receiving voice parameters and synthesizing voice therefrom, a transmit audio path, a whitening filter for levelling the spectrum of the audio signal on the transmit path to provide a levelled signal, decision means coupled to the whitening filter to measure energy in the levelled signal and thereby to detect voice on the transmit path, characterized in that the whitening filter is a voice whitening filter and means are provided for adapting the whitening filter according to the voice parameters received by the voice decoder in the receive path.

2. A voice activity detector according to claim 1 further comprising a noise whitening filter for filtering the signal on the transmit path to provide a signal to the decision means which is levelled with respect to noise.

3. An echo suppressor comprising a voice activity detector according to claim 2 and further comprising at least one of a transmit attenuator and a receive attenuator in the respective paths for attenuation of audio signals on the or each path, the decision means of the voice activity detector being coupled to the transmit and/or receive attenuator for controlling the or each attenuator to suppress audio signals on one or both paths when voice is detected by the voice activity detector.

4. An echo suppressor comprising a voice activity detector according to claim 1 and further comprising at least one of a transmit attenuator and a receive attenuator in the respective paths for attenuation of audio signals on the or each path, the decision means of the voice activity detector being coupled to the transmit and/or receive attenuator for controlling the or each attenuator to suppress audio signals on one or both paths when voice is detected by the voice activity detector.

5. An echo suppressor comprising:

a receive audio path having a voice decoder for receiving voice parameters and synthesizing voice therefrom, a transmit audio path, receive and transmit attenuation means in the respective paths for attenuation of audio signals on those paths, a voice activity detector for detecting voice on the transmit path and coupled to the receive and transmit attenuator means for controlling the attenuator means to suppress audio signals on the respective paths when voice is detected on the transmit path, means in the transmit path for distinguishing between a near-end voice entered into the transmit path and a far-end voice entered into the transmit path as a result of an echo from the receive path, means for providing a first disposition of the transmit and receive attenuators when voice on the transmit path is substantially due to echo from the receive path and a second disposition of the transmit and receive attenuators when voice on the transmit path is at least partially due to near-end voice, pitch distinguishing means for distinguishing between the near-end and far-end voices.

6. An echo suppressor according to claim 5, wherein the first disposition comprises relatively high attenuation (Z) in the transmit attenuator and the second disposition comprises relatively low attenuation (X) in the transmit attenuator.

7. An echo suppressor according to claim 6, wherein the second disposition comprises further attenuation (Y) in the receive attenuator.

8. An echo suppressor according to claim 7, wherein the first disposition comprises substantially no attenuation in the receive attenuator.

9. An echo suppressor according to claim 7 or 8, wherein X+Y is approximately equal to Z and where X and Y are selected such that simultaneous far and near-end users can hear each other.

10. A voice activity detector and echo suppressor apparatus, comprising:

a receive audio path having a voice decoder for receiving voice parameters and synthesizing voice therefrom, a transmit audio path, receive and transmit attenuation means in the respective paths for attenuation of audio signals on those paths, a voice activity detector for detecting voice on the transmit path and coupled to the receive and transmit attenuator means for controlling the attenuator means to suppress audio signals on the respective paths when voice is detected on the transmit path, means in transmit path for distinguishing between a near-end voice entered into the transmit path and a far-end voice entered into the transmit path as a result of an echo from the path, means for providing a first disposition of the transmit and receive attenuators when voice on the transmit path substantially due to echo from the receive path and a second disposition of the transmit and receive attenuator when voice on the transmit path is at least partially due to near-end voice, a whitening filter for levelling the spectrum of the audio signal on the transmit path to provide a levelled signal, decision means coupled to the whitening filter to measure energy in the levelled signal and thereby to detect voice on the transmit path, wherein the whitening filter is a voice whitening filter and means are provided for adapting the whitening filter according to the voice parameters received by the voice decoder in the receive path.

11. The apparatus of claim 10 further comprising a noise whitening filter for filtering the signal on the transmit path to provide a signal to the decision means which is levelled with respect to noise.

12. The apparatus of claim 11, wherein the second disposition comprises further attenuation (Y) in the receive attenuator.

13. The apparatus of claim 10, wherein the first disposition comprises relatively high attenuation (Z) in the transmit attenuator and the second disposition comprises relatively low attenuation (X) in the transmit attenuator.

14. The apparatus of claim 13, wherein the first disposition comprises substantially no attenuation in the receive attenuator.

15. The apparatus of claim 13, wherein X+Y is approximately equal to Z and where X and Y are selected such that simultaneous far and near-end users can hear each other.

* * * * *

UNITED STATES PATENT AND TRADEMARK OFFICE
CERTIFICATE OF CORRECTION

PATENT NO. : 5,619,566
DATED : April 8, 1997
INVENTOR(S) : Eliezer Fogel

It is certified that error appears in the above-indentified patent and that said Letters Patent is hereby corrected as shown below:

Column 8, line 33, claim 10, between "the" and "path", insert -- receive--.
Column 8, line 35, claim 10, after "path" insert --is--.
Column 8, lines 37 and 38, claim 10, delete "attenuator" and insert therefor --attenuators--.

Signed and Sealed this

Twenty-seventh Day of January, 1998

BRUCE LEHMAN

*Attest:*

*Attesting Officer*        *Commissioner of Patents and Trademarks*